US009085377B2

(12) United States Patent
Baghdasarian

(10) Patent No.: US 9,085,377 B2
(45) Date of Patent: Jul. 21, 2015

(54) REDUNDANT FUSE WIRE RELEASE DEVICE

(75) Inventor: Varouj Baghdasarian, Cupertino, CA (US)

(73) Assignee: SPACE SYSTEMS/LORAL, LLC, Palo Alto, CA (US)

( * ) Notice: Subject to any disclaimer, the term of this patent is extended or adjusted under 35 U.S.C. 154(b) by 902 days.

(21) Appl. No.: 13/068,655

(22) Filed: May 17, 2011

(65) Prior Publication Data
US 2012/0293294 A1 Nov. 22, 2012

(51) Int. Cl.
| H01H 85/02 | (2006.01) |
| B64G 1/22 | (2006.01) |
| H01H 85/046 | (2006.01) |
| H01H 85/00 | (2006.01) |
| B64G 1/44 | (2006.01) |
| B64G 1/66 | (2006.01) |

(52) U.S. Cl.
CPC ........... *B64G 1/222* (2013.01); *H01H 85/0047* (2013.01); *H01H 85/0052* (2013.01); *H01H 85/046* (2013.01); *B64G 1/44* (2013.01); *B64G 1/66* (2013.01)

(58) Field of Classification Search
CPC .......... B64G 1/645; B64G 1/222; B64G 1/44; B64G 1/66; G05G 17/00; Y10T 74/11; Y10T 403/11; Y10T 403/21; H01H 85/046; H01H 85/0047; H01H 85/0052
USPC ......... 337/142, 1, 401, 5, 140, 159, 182, 183, 337/290, 296, 297, 416; 403/2, 28; 74/2
See application file for complete search history.

(56) References Cited

U.S. PATENT DOCUMENTS

| 1,374,368 | A | * | 4/1921 | Roy Drake Le | 337/294 |
| 1,405,271 | A | * | 1/1922 | Burton Frank M | 337/258 |
| 3,076,078 | A | * | 1/1963 | Murdoch Richard 0 et al. | 337/143 |
| 3,558,989 | A | * | 1/1971 | Dameme et al. | 361/106 |
| 3,695,116 | A | * | 10/1972 | Baur | 74/2 |
| 3,924,688 | A | * | 12/1975 | Cooper et al. | 169/61 |
| 4,037,318 | A | * | 7/1977 | Burkley et al. | 29/623 |
| 4,527,215 | A | * | 7/1985 | Wessing | 361/124 |
| 4,617,544 | A | * | 10/1986 | Mooz et al. | 337/3 |
| 4,788,622 | A | * | 11/1988 | Cinquin | 361/124 |
| 4,906,962 | A | * | 3/1990 | Duimstra | 337/239 |
| 5,323,950 | A | * | 6/1994 | Mamon | 228/50 |
| 5,438,173 | A | * | 8/1995 | Rudoy et al. | 200/52 R |
| 5,471,888 | A | * | 12/1995 | McCormick | 74/2 |
| 5,606,889 | A | * | 3/1997 | Bielinski et al. | 74/2 |
| 5,621,373 | A | * | 4/1997 | McCormick | 337/1 |
| 5,748,066 | A | * | 5/1998 | Holt | 337/1 |

(Continued)

*Primary Examiner* — Anatoly Vortman
(74) *Attorney, Agent, or Firm* — Kenneth W. Float

(57) ABSTRACT

Redundant fuse wire apparatus and redundant release devices, such as those used to release deployable appendages, such as solar array and reflectors disposed on satellites, and the like. An exemplary redundant release device comprises a restraint release mechanism having one or more restraint release arms, a redundant release device comprising a segmented spool having a plurality of segments that are constrained from separating by spring restraint tape releasably secured to the restraint release arms, a redundant fuse wire assembly comprising primary and redundant positive contacts, a common negative contact, primary and redundant fuse wires respectively connected between the primary positive and common negative contacts and the redundant positive and common negative contacts that respectively wrap around the opposed positive contact and the restraint release arms, and an electrical power source for heating and severing the fuse wires.

17 Claims, 9 Drawing Sheets

(56) References Cited

U.S. PATENT DOCUMENTS

| | | | |
|---|---|---|---|
| 5,771,742 A * | 6/1998 | Bokaie et al. | 74/2 |
| 6,073,914 A * | 6/2000 | Roth et al. | 254/29 A |
| 6,133,818 A | 10/2000 | Hsieh et al. | |
| 6,433,990 B1 * | 8/2002 | Rudoy et al. | 361/160 |
| 6,747,541 B1 * | 6/2004 | Holt et al. | 337/401 |
| 7,396,182 B2 * | 7/2008 | Retat et al. | 403/2 |
| 8,327,511 B2 * | 12/2012 | Valembois | 24/603 |
| 2002/0080547 A1 * | 6/2002 | Rudoy et al. | 361/161 |
| 2003/0076215 A1 * | 4/2003 | Baghdasarian | 337/401 |
| 2009/0317174 A1 * | 12/2009 | Baghdasarian | 403/2 |

\* cited by examiner

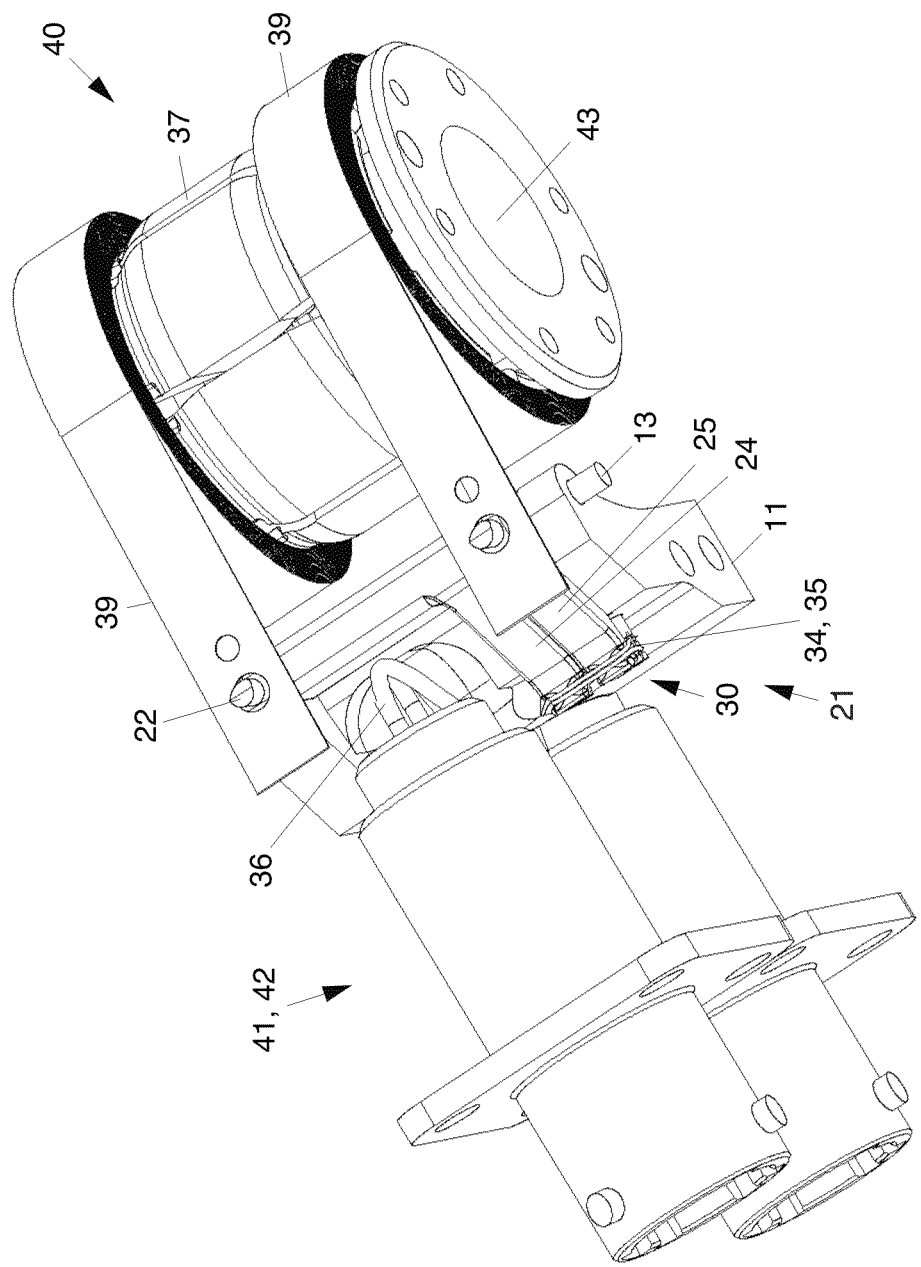

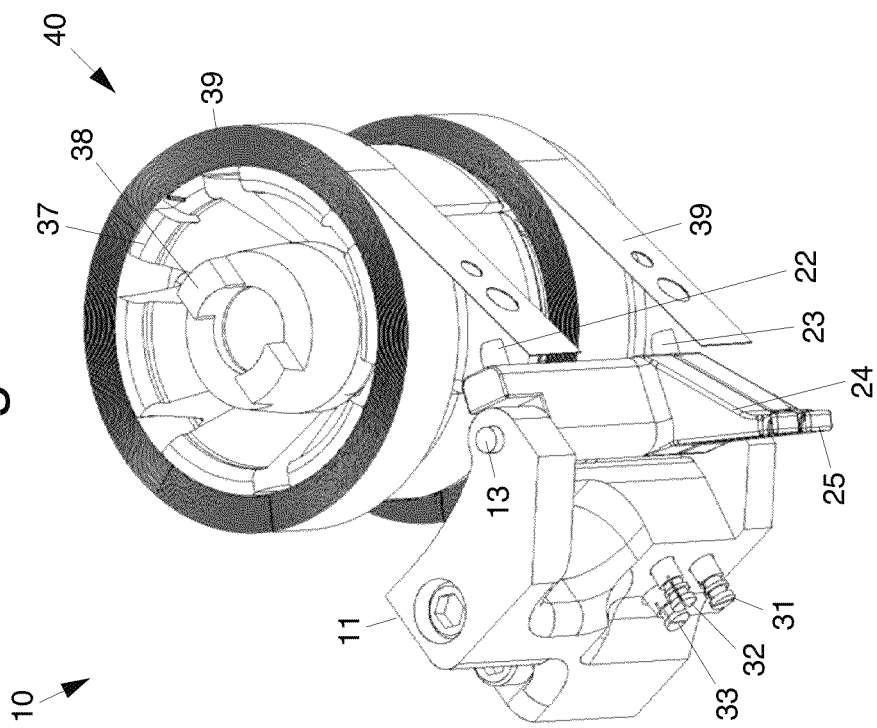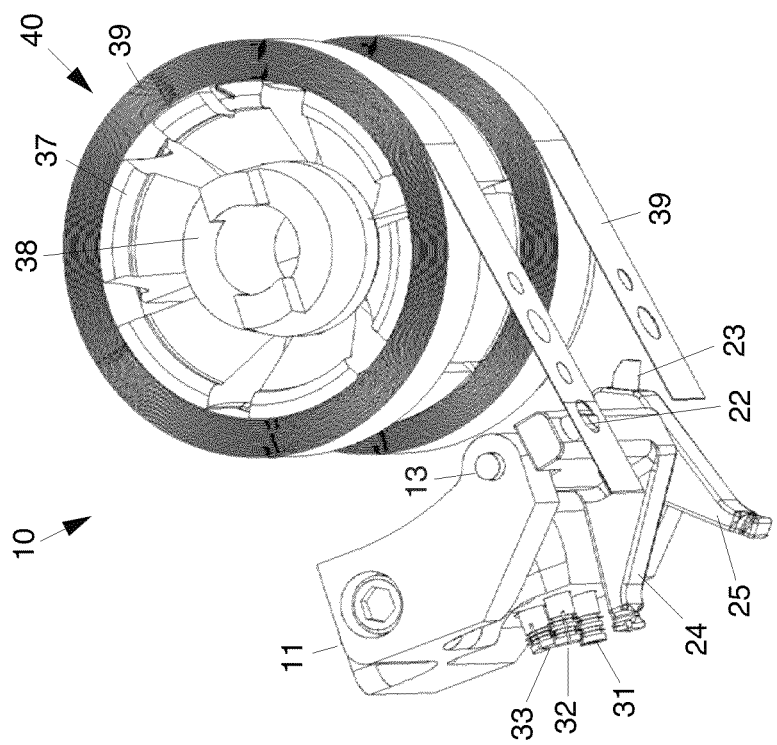

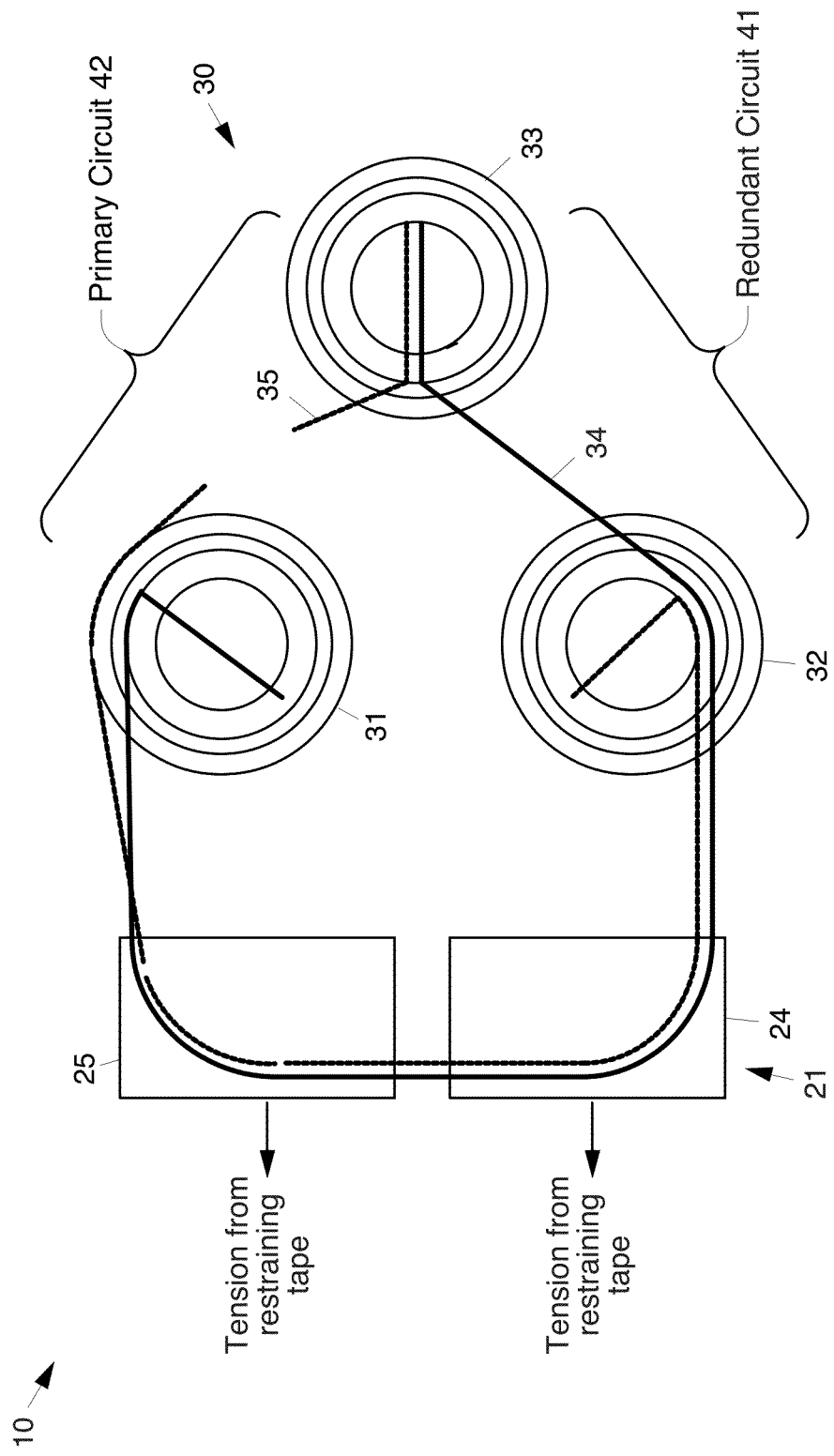

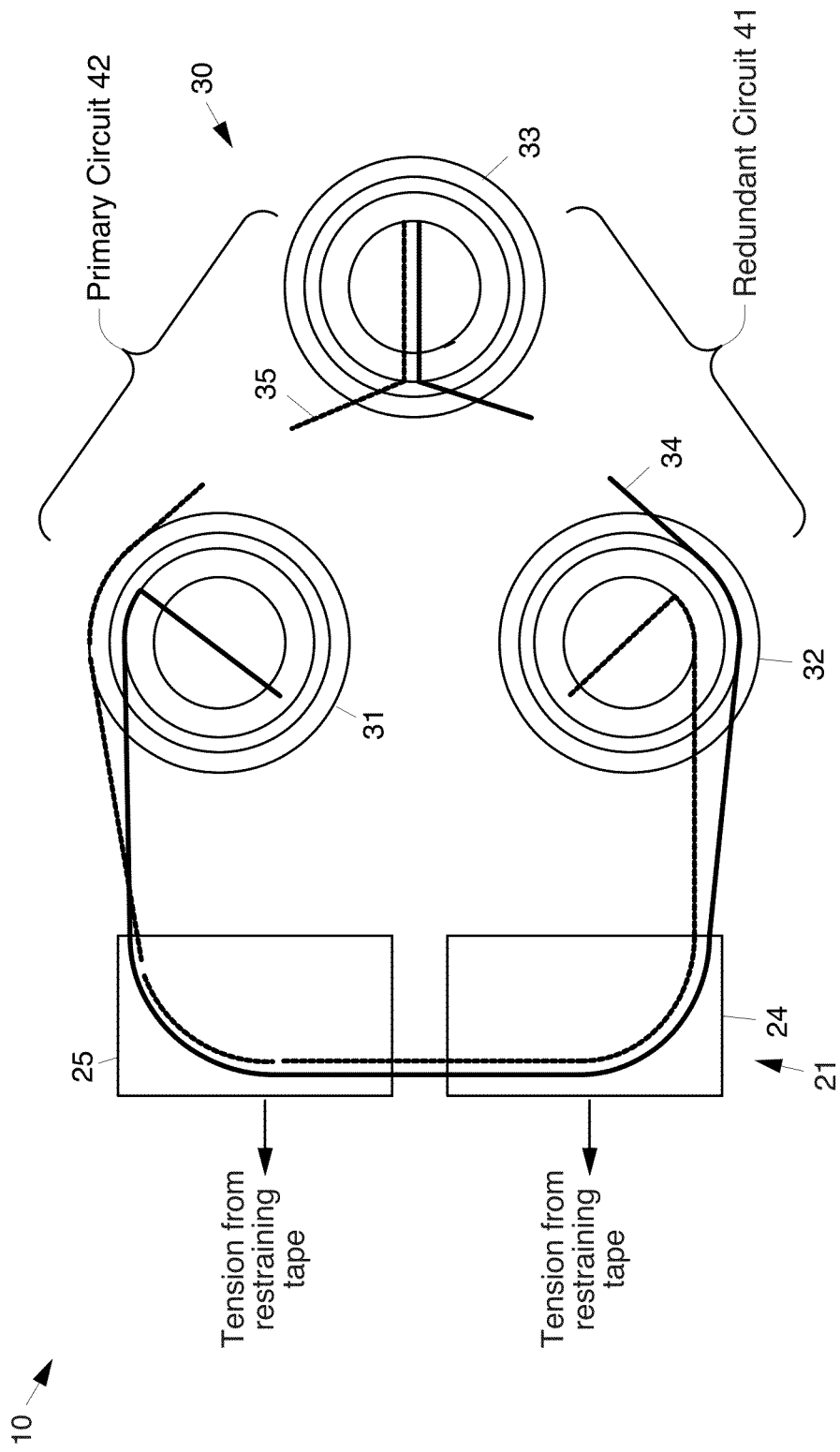

REDUNDANT FUSE WIRE RELEASE DEVICE

BACKGROUND

The present invention relates generally to release devices, and more particularly, to a redundant fuse wire release device and redundant fuse apparatus that may be used to stow or release items such as solar arrays, antenna positioning mechanisms, reflectors, and the like, found on satellites, space stations, and spacecraft, for example.

Conventional prior art non-explosive release apparatus, such as a separation spool device, for example, is used to stow or release a captured member that constrains deployment of a spacecraft element, for example, such as a solar array, in a stowed position. In such apparatus, a single fuse wire acts as a locking member that fastens a tensioned member wrapped in tension around a split spool. When the tensioned member is under tension, the split spool is clamped to a portion of the device to be deployed (the captured member) which prevents deployment of the captured member, such as a solar array. Once the release device is actuated, the fuse wire unlocks by self-destructing, thereby releasing the tensioned member to unclamp the captured member and allow deployment.

However, such a single fuse wire locking member is subject to self-unlocking resulting from mechanical failure. The single locking member (fuse wire) can fail due to mechanical stress and cause premature release of the device. An electrical failure can also prevent the device from releasing if inadequate current flows to melt the fuse wire upon actuation.

To overcome the limitations of this conventional single fuse wire locking member, a redundant fuse for use with in a split spool device was developed by the assignee of the present invention is disclosed in U.S. Pat. No. 6,133,818, issued to Hseih, et al., and is an example of a redundant fuse wire design for an application similar to that of the present invention.

The redundant fuse wire design disclosed in U.S. Pat. No. 6,133,818 uses three individual fuses configured in a triangular shape preventing a round disk from release. It requires cutting two of three fuses to release the disk, and it prevents premature release if one fuse is accidentally cut, thus, it is single point fault tolerant.

The shortcoming of this redundant fuse wire design is that third fuse does not always get cut upon actuation, and thus it could potentially cause release hang up.

Also, with three fuses rigidly connected to three contacts, depending upon the accuracy of fuse wrapping tension, the load may not be equally shared by all there fuses, therefore it is possible for one or two fuses to be overloaded while the other is not loaded at all, resulting in a potential for fuse overload In view of the above, it would be desirable to have a improved redundant fuse wire release device and redundant fuse apparatus.

BRIEF DESCRIPTION OF THE DRAWINGS

The various features and advantages of the present invention may be more readily understood with reference to the following detailed description taken in conjunction with the accompanying drawing figures, wherein like reference numerals designate like structural element, and in which:

FIG. 6a-6c show engagement and disengagement of the restraint tapes with the release arms; and FIGS. 7a and 7b illustrate the sequence of events performed when actuating the redundant fuse wire release device.

DETAILED DESCRIPTION

Figure 1:
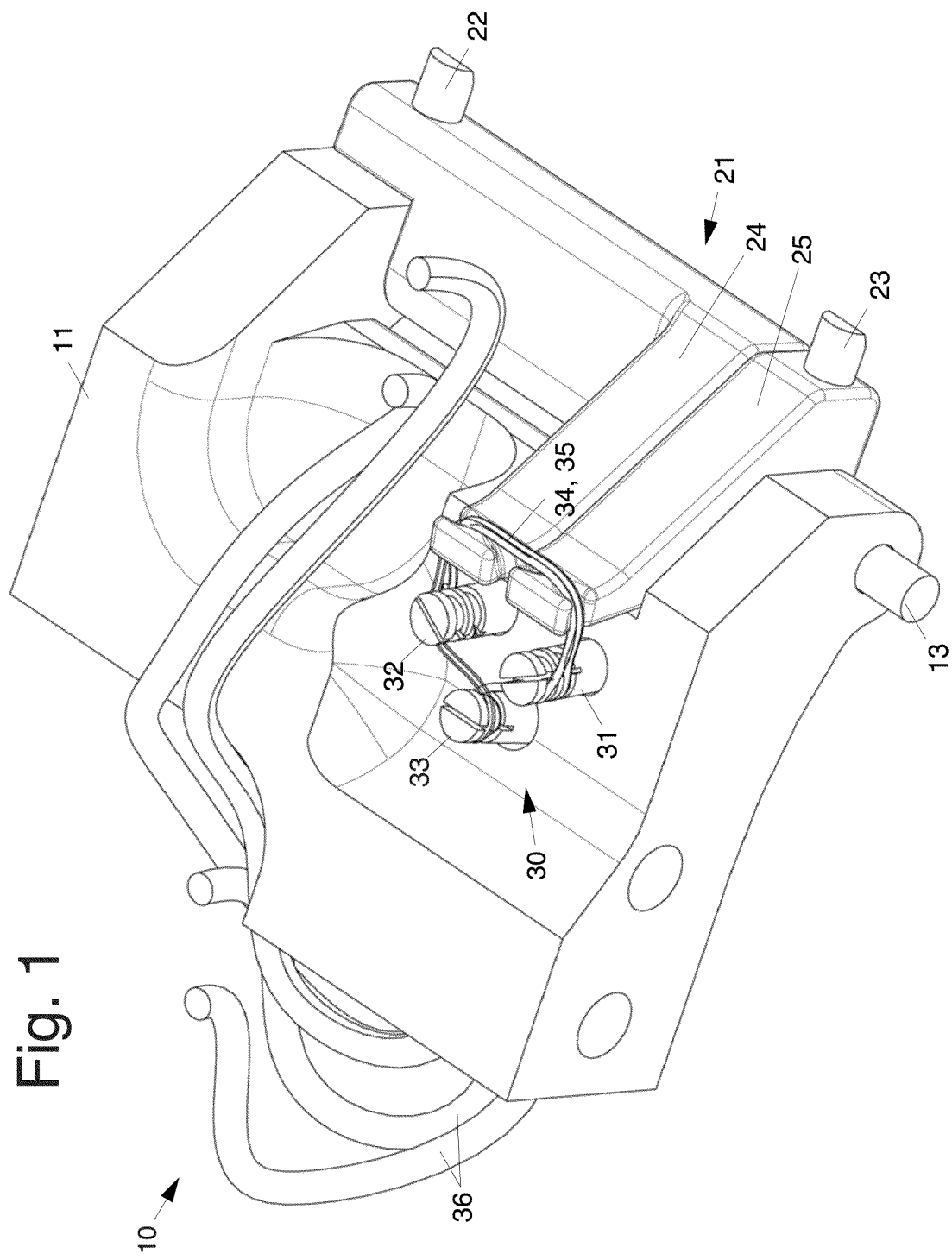
FIG. 1 illustrates exemplary redundant fuse wire release device.
Figure 2:
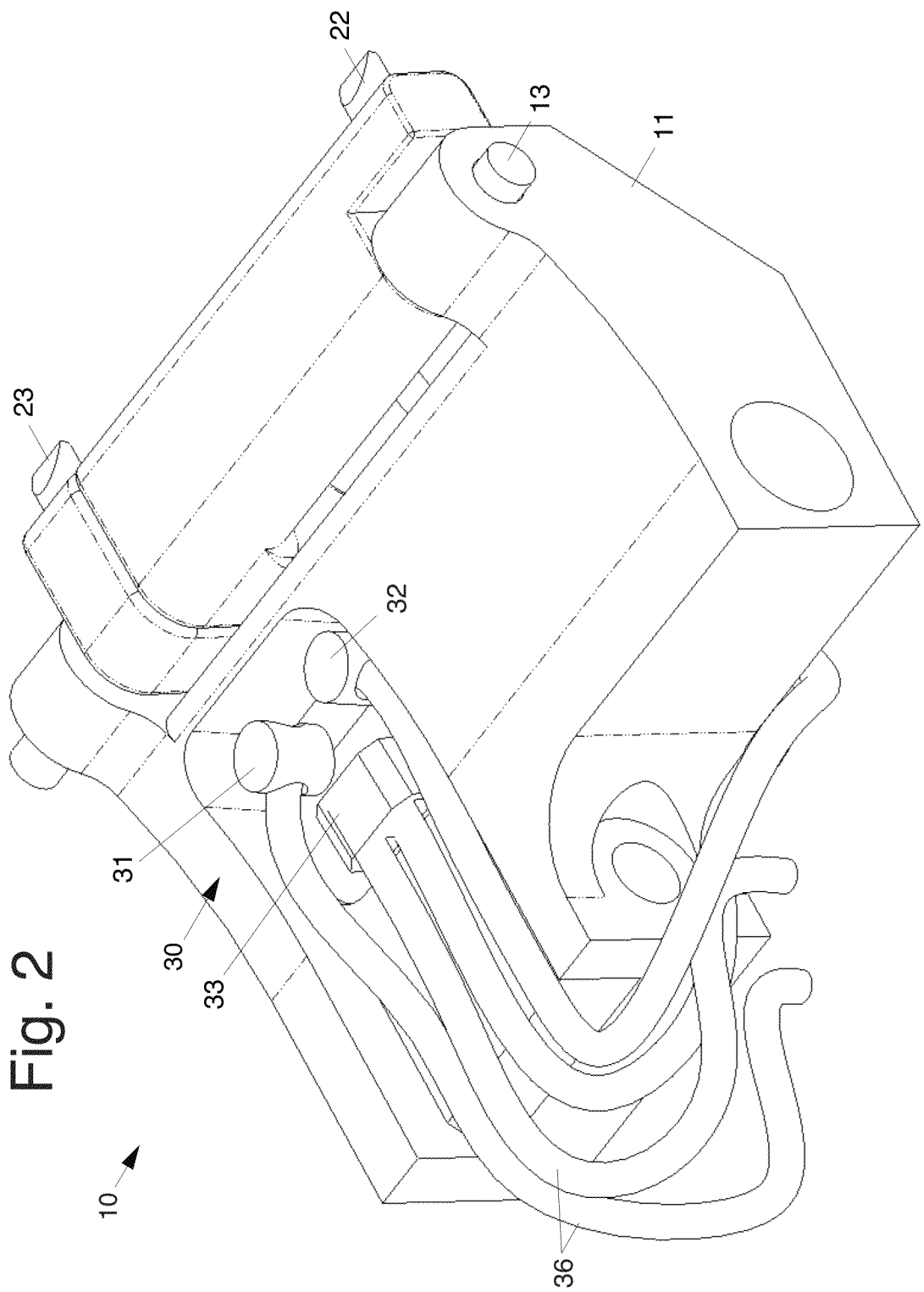
FIG. 2 illustrates a bottom view of the redundant fuse wire release device.
Figure 3:
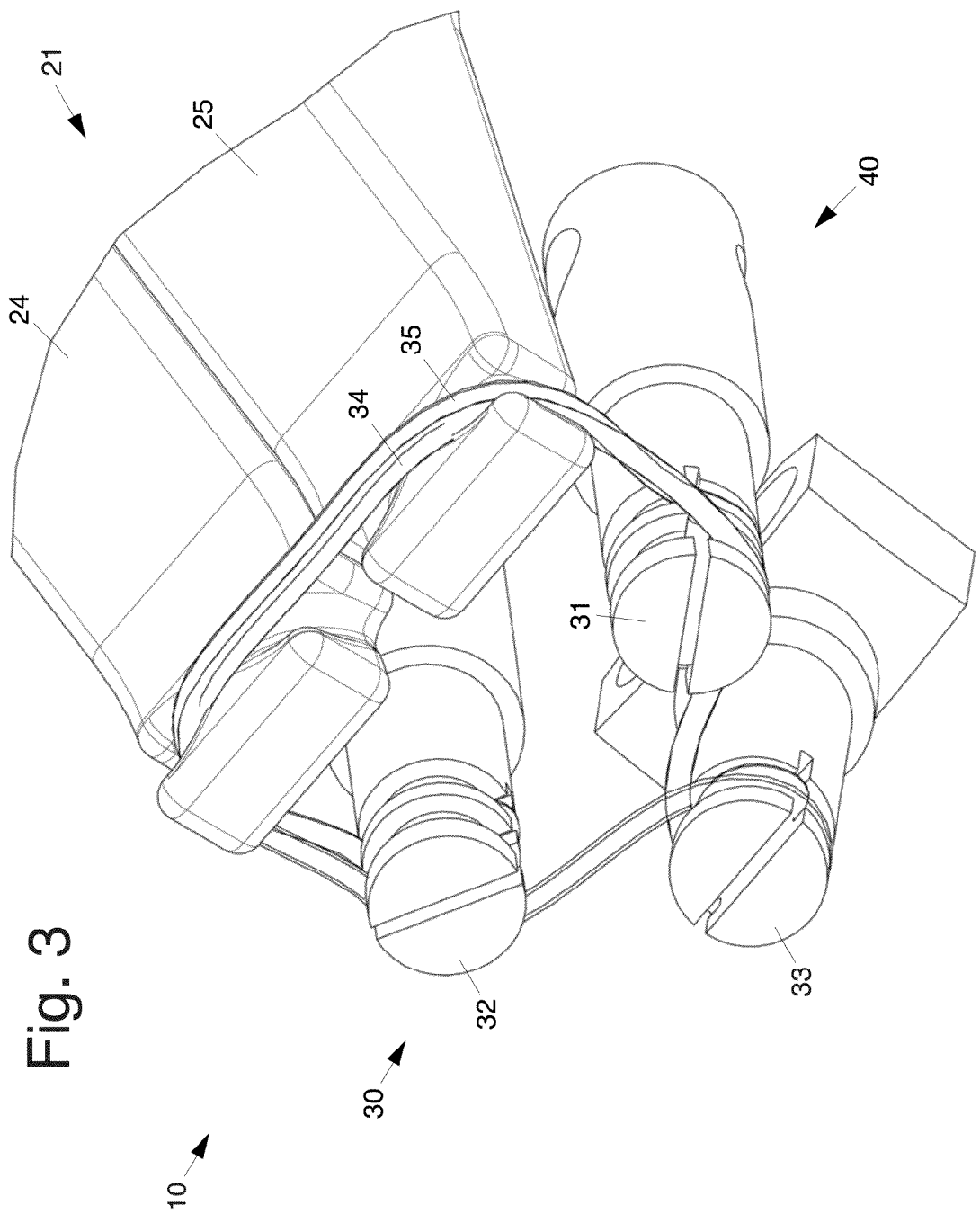
FIG. 3 illustrates an enlarged view of a redundant fuse wire assembly that may be used in the redundant fuse wire release device.
Figure 4:
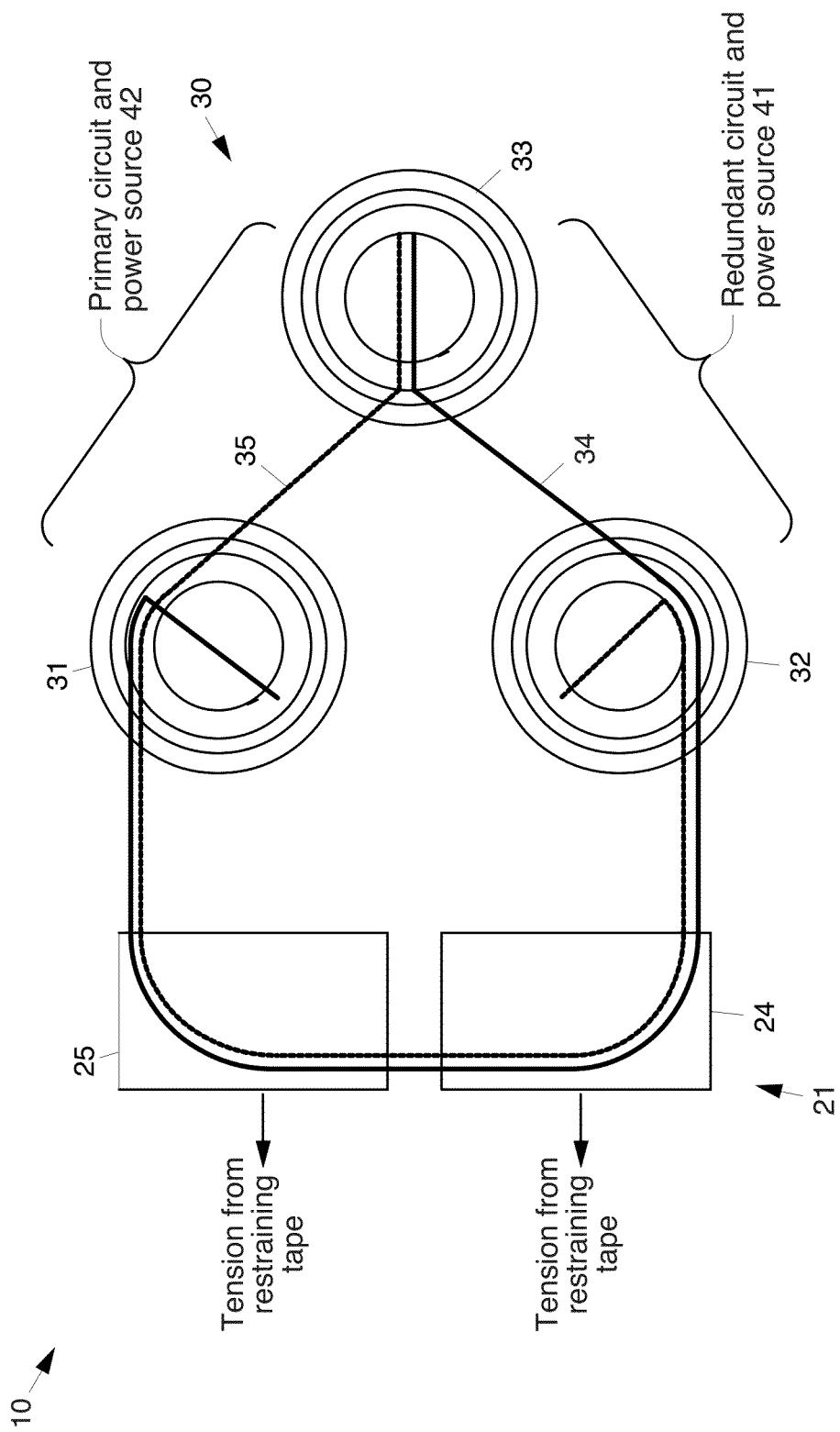
FIG. 4 illustrates an enlarged plan view of the redundant fuse wire assembly.
Figure 5:
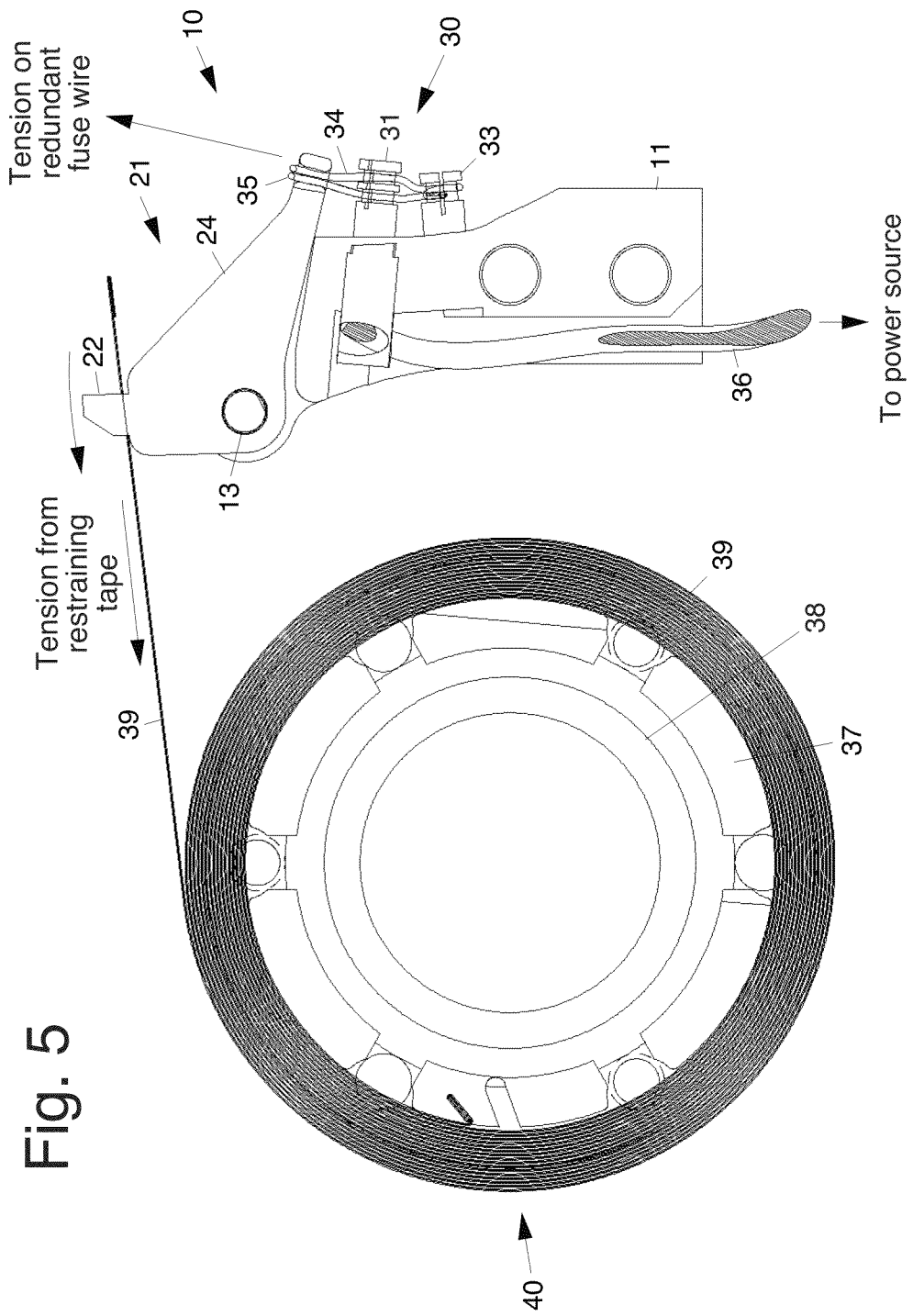
FIG. 5 illustrates an enlarged side view of the redundant fuse wire release device.

Referring to the drawing figures, FIG. 1 illustrates exemplary redundant fuse wire release device 10. FIG. 2 illustrates a bottom view of the redundant fuse wire release device 10. FIG. 3 illustrates an enlarged view of a redundant fuse wire assembly 30 that may be used in the redundant fuse wire release device 10. FIG. 4 illustrates an enlarged plan view of the redundant fuse wire assembly 10. FIG. 5 illustrates an enlarged side view of the redundant fuse wire release device 10. FIG. 6 shows engagement and disengagement of restraint tapes from release arms. FIGS. 7a and 7b illustrate the sequence of events performed when actuating the redundant fuse wire release device 10.

The redundant fuse wire release device 10 is a fully redundant low shock release device actuated using a redundant fuse wire assembly 30. More particularly, and referring to FIGS. 1 and 5, the redundant fuse wire release device 10 comprises a housing 11 or fuse block 11 (FIG. 1), a restraint release mechanism 21 (FIG. 1), a redundant fuse wire assembly 30 (FIG. 1), a redundant release device 40 (FIG. 5), and an electrical power source 41, 42 (FIGS. 4, 7a, 7b).

The redundant fuse wire assembly 30 comprises a primary positive contact 31, a redundant positive contact 32, a common negative contact 33, and primary and redundant fuse wires 34, 35. Each of the contacts 31, 32, 33 are housed in the housing 11 or fuse block 11. Electrical wires 36 connect between the electrical power source 41, 42 and respective contacts 31, 32, 33.

The primary fuse wire 34 is connected between the primary positive contact 31 and the common negative contact 33 and wraps around the redundant positive contact 32 and rotatable restraint release arms 24, 25. The redundant fuse wire 35 is connected between the redundant positive contact 32 and the common negative contact 33 and wraps around the primary positive contact 31 and the rotatable restraint release arms 24, 25.

More particularly, the restraint release mechanism 21 comprises a top restraint pin 22, a bottom restraint pin 23, a top rotatable restraint release arm 24, and a bottom rotatable restraint release arm 25. The restraint release arms 24, 25 are preferably made of dielectric material to prevent electrical shorting to ground. The restraint release arms 24, 25 are free to rotate around a hinge 13. The restraint release arms 24, 25 are held in place under tension from tightly wound stainless steel spring restraint tapes 39 (FIG. 5) by the primary and redundant fuse wires 34, 35.

Referring to FIG. 5, the redundant release device 40 comprises a segmented spool 37 assembled on a cylindrical base 43. The segments of the segmented spool 37 are prevented from separating by tightly wound stainless steel spring restraint tapes 39. The restraint release arms 24, 25 are held in tension by the restraint tapes 39 that engages the top and bottom restraint pins 22, 23 of the restraint release arms 24, 25. The restraint tape 39 are wrapped around the segmented spool 37.

FIGS. 6a-6c show engagement and disengagement of the restraint tapes 39 from the release arms 24, 25. As shown, once both fuse wires 34, 35 are cut, both release arms 24, 25 are free to rotate and allow the restraint tapes 39 to disengage from the arms 24, 25 under tension provided by wound spring tapes 39, acting as a clock spring trying to unwind.

A nut 38 and rod assembly (not shown) that is held in place by the segmented spool 37 is prevented from retracting unless the segments of the segmented spool 37 are separated. Release of either or both restraint tapes 39 allow separation of segments of the segmented spool 37 and release of nut and rod assembly. The restraint tapes 39 unwind once disengaged from the restraint release arms 24, 25, which are restrained from rotation by the electrically actuated redundant fuse wires 34, 35. The redundant fuse wire device 10 is electrically and mechanically redundant to avoid single point failure while providing simultaneous release capability.

The redundant fuse wire release device 10 provides a release function upon electrical command while offering single fault tolerant redundancy with maximum current split between the two fuses 34, 35. The redundant fuse wire release device 10 is used in the release device 10 as a release initiation element actuated by the electrical power source 41, 42.

Thus, the design of the redundant fuse wire device 10 includes two redundant fuses 34, 35. Both fuses 34, 35 are cut (heated and severed) upon actuation of electrical power from power supplies 41, 42, thus there is no uncut fuse after actuation to pose a release hang up. Further, unlike the conventional redundant fuse wire design discussed in the Background section, where each of the three fuses may be loaded with different tension, the disclosed redundant fuse wire device 10 equalizes the tension in both fuses 34, 35 due to flexibility of the common negative contact 33, and thus one fuse 34, 35 does not get overloaded.

The redundant fuse wire device 10 may be preferably configured to provide maximum current to burn both fuses 34, 35 one at a time. The redundant fuse wire device 10 is configured as a combination of parallel and series circuitry with different fuse wire lengths to maximize the resistance difference between two parallel circuits in order to minimize the power requirement for firing both fuses 34, 35 from a given power source 41, 42.

The redundant fuse wire device 10 comprises two positive contacts 31, 32 and one common negative contact 33. Each fuse 34, 35 starts from a positive contact 31, 32 and ends at the common negative contact 33 while passing over the other positive contact 32, 31. This arrangement provides redundancy in firing from either positive contact while providing redundancy against single fuse failure to release the restraint release arms 24, 25. This provides a single fault fail-safe design against premature failure of either fuse.

The redundant fuse wire assembly 30 is electrically and mechanically redundant to prevent premature release while providing simultaneous release capability. Either primary or secondary circuits fire both fuses 34, 35 at the same time. It should be noted that the time required to burn the fuse wires 34, 35 is in milliseconds, and that a shorter fuse wire 34, 35 is burnt milliseconds sooner than a longer fuse wire 34, 35. However, for practical purposes, both fuse wires 34, 35 are cut substantially simultaneously. The redundant fuse wire assembly 30 is preferably wired to release both top and bottom restraints 24, 25 simultaneously, although it may be wired to release each restraint 24, 25 individually.

The redundant fuse wire assembly has two independent fuses 34, 35 in an overlapping configuration. Both fuses 34, 35 must be severed in order to release the device 10. A single fuse 34, 35 is configured to provide at least a one-hundred percent strength margin against failure. The redundant fuse wire assembly 30 allows fuse tension balancing to eliminate possible assembly slack. The fuse block 11 provides electrical isolation for the contacts 31, 32, 33 and structural support for the restraint release arms 24, 25.

With regard to redundancy, the redundant fuse wire assembly 30 thus has two substantially identical circuits with a common negative contact 33. The redundant fuse wire assembly 30 has two independent positive contacts and one common negative contact 33. Actuation of either circuit fires both fuses 34, 35.

Referring to FIGS. 7a and 7b, they illustrate an exemplary sequence of events performed when actuating the redundant fuse wire release device 10. Power may be applied to the primary circuit, and more current flows to the redundant fuse 35 (because the fuse wire is shorter than the primary fuse,) thus redundant fuse 35 gets cut or severed first, then full current flows to primary fuse 34 and it is cut or severed second. Motion of both release arms 24, 25 initiate simultaneously as soon as the second fuse wire 35 is cut. However, it is to be understood that either the primary circuit or the secondary circuit may be configured to fire other fuse configurations not described herein, to enable motion of top or bottom release arms 24, 25 separately to allow separate release of the top or bottom restraint release arms 24, 25.

Thus, improved redundant release devices and redundant fuse apparatus have been disclosed that may be used to stow or release items such as solar arrays, antenna positioning mechanisms, reflectors, and the like, found on satellites, space stations, and spacecraft, for example. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. An apparatus comprising:
   a restraint release mechanism comprising one or more restraint release arms;
   a redundant fuse wire assembly coupled to the redundant release mechanism comprising a primary positive contact, a redundant positive contact, a common negative contact, a primary fuse wire electrically connected between the primary positive contact and the common negative contact that electrically contacts the redundant positive contact and retains the one or more restraint release arms, and a redundant fuse wire electrically connected between the redundant positive contact and the common negative contact that electrically contacts the primary positive contact and retains the one or more restraint release arms, wherein both primary and redundant fuse wires must be severed to release the one or more restraint release arms; and
   an electrical power source coupled to the redundant fuse wire assembly for heating and severing the fuse wires.

2. The apparatus recited in claim 1 wherein the one or more restraint release arms comprise dielectric material.

3. The apparatus recited in claim 1 further comprising a segmented spool having a plurality of segments that are constrained from separating by spring restraint tape releasably secured to the restraint release arms, and wherein the segments of the segmented spool are prevented from separating by the spring restraint tape, the spring restraint tape comprising tightly wound spring tape.

4. The apparatus recited in claim 1 wherein wiring of the contacts provides redundancy in firing from either positive contact and provides redundancy against single fuse failure to release the one or more restraint release arms.

5. The apparatus recited in claim 1 wherein the primary and redundant fuse wires are severed at substantially the same time.

6. The apparatus recited in claim 1 wherein the common negative contact provides flexibility to equalize tension in the fuse wires.

7. An apparatus comprising:
   a restraint release mechanism comprising one or more dielectric restraint release arms;
   a redundant fuse wire assembly coupled to the redundant release mechanism comprising a primary positive contact, a redundant positive contact, a common negative contact, a primary fuse wire electrically connected between the primary positive contact and the common negative contact that electrically contacts the redundant positive contact and retains the one or more dielectric restraint release arms, and a redundant fuse wire electrically connected between the redundant positive contact and the common negative contact that electrically contacts the primary positive contact and retains the one or more dielectric restraint release arms, wherein both primary and redundant fuse wires must be severed to release the one or more dielectric restraint release arms; and
   an electrical power source coupled to the redundant fuse wire assembly for heating and severing the fuse wires.

8. The apparatus recited in claim 7 wherein the primary and redundant fuse wires are severed at substantially the same time.

9. The apparatus recited in claim 7 wherein the common negative contact provides flexibility to equalize tension in the fuse wires.

10. The apparatus recited in claim 7 further comprising a segmented spool having a plurality of segments that are constrained from separating by spring restraint tape releasably secured to the one or more dielectric restraint release arms, and wherein the segments of the segmented spool are prevented from separating by the spring restraint tape, the spring restraint tape comprising tightly wound spring tape.

11. The apparatus recited in claim 10 wherein the primary and redundant fuse wires are severed at substantially the same time.

12. The apparatus recited in claim 10 wherein the common negative contact provides flexibility to equalize tension in the fuse wires.

13. The apparatus recited in claim 7 wherein wiring of the contacts provides redundancy in firing from either positive contact and provides redundancy against single fuse failure to release the one or more dielectric restraint release arms.

14. A redundant fuse wire apparatus for use with a redundant release device having a restraint release mechanism comprising one or more restraint release arms and an electrical power source for heating and severing fuse wires, comprising:
   a redundant fuse wire assembly comprising a primary positive contact, a redundant positive contact, a common negative contact, a primary fuse wire electrically connected between the primary positive contact and the common negative contact that electrically contacts the redundant positive contact and retains the one or more restraint release arms, and a redundant fuse wire electrically connected between the redundant positive contact and the common negative contact that electrically contacts the primary positive contact and retains the one or more restraint release arms, wherein both primary and redundant fuse wires must be severed to release the one or more restraint release arms.

15. The apparatus recited in claim 14 wherein the one or more restraint release arms comprise dielectric material.

16. The apparatus recited in claim 14 wherein the redundant release device comprises a segmented spool having a plurality of segments that are constrained from separating by spring restraint tape releasably secured to the one or more restraint release arms, and wherein the segments of the segmented spool are prevented from separating by the spring restraint tape, the spring restraint tape comprising tightly wound stainless tape.

17. The a apparatus recited in claim 14 wherein wiring of the contacts provides redundancy in firing from either positive contact and provides redundancy against single fuse failure to release the one or more restraint release arms.

\* \* \* \* \*